Patented Sept. 1, 1953

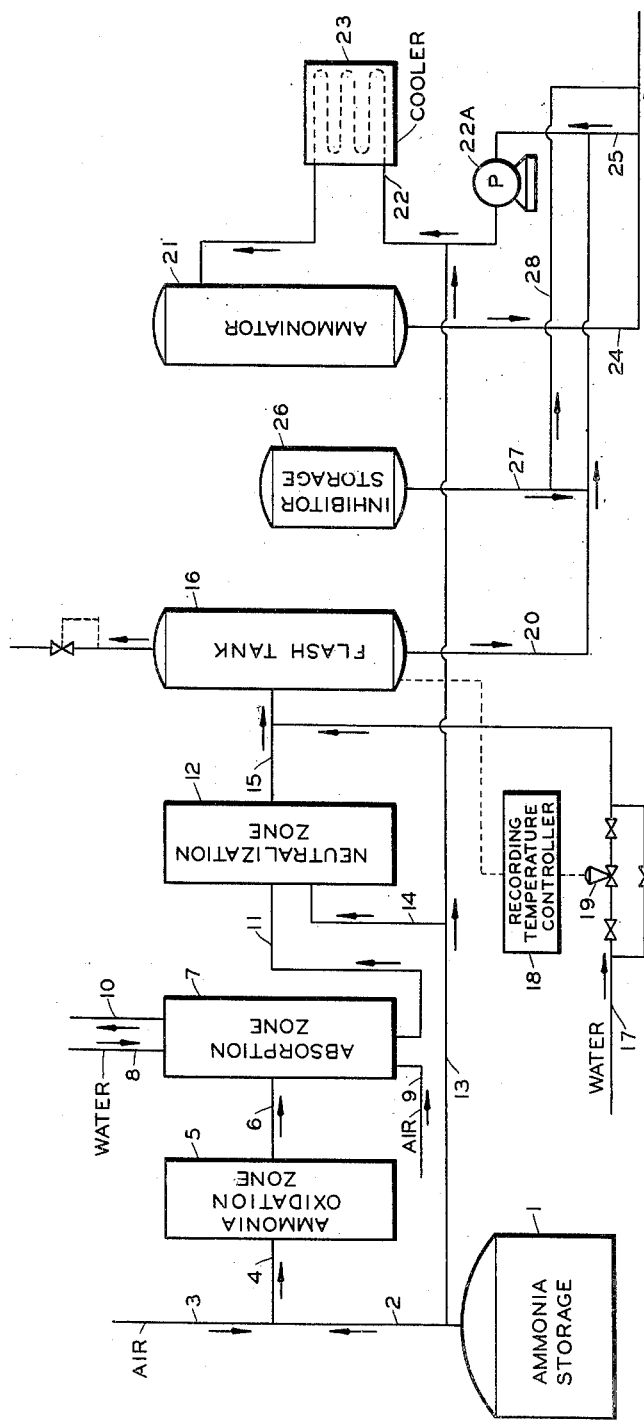

2,650,660

UNITED STATES PATENT OFFICE 2,650,660

METHOD OF ADJUSTING THE CONCENTRATION OF AMMONIUM NITRATE SOLUTIONS

Tom E. Martin, Bartlesville, Okla., and Edward Edmunds, Jr., Albuquerque, N. Mex., assignors to Phillips Petroleum Company, a corporation of Delaware Application June 15, 1950, Serial No. 168,238

6 Claims. (Cl. 159—47)

This invention relates to a novel process for producing nitrogen solutions. In one of its aspects this invention relates to a novel process for the continuous production of nitrogen solutions containing ammonium nitrate, ammonia and water. In another of its aspects this invention relates to a novel method for controlling the concentration of aqueous ammonium nitrate solutions for use in producing nitrogen solutions containing ammonium nitrate, ammonia and water.

Nitrogen solutions have been prepared and employed as articles of commerce, particularly in the fertilizer industry. The solutions usually possess a high nitrogen content, and for the reason they are quite useful as fertilizers. The term "nitrogen solution" as used throughout this disclosure, refers to any solution containing the three major components, ammonium nitrate, ammonia, and water. The components may be present as a mixture or as a true solution, and a certain degree of association or chemical combination of the components may or may not occur. The particular nitrogen solutions more or less standard commercially at the present time contain 37 to 41 per cent nitrogen, and they comprise 55 to 67 per cent ammonium nitrate, 16 to 26 per cent free ammonia, and 13 to 19 per cent water. The preferred compositions of the products of our process are within the above ranges, but our invention is not necessarily limited by these compositions.

Heretofore nitrogen solutions have been prepared by mixing ammonium nitrate, either as a solid or in the form of an aqueous solution, with liquid or vaporous ammonia and water in the desired proportions in a batch operation. It is one of the objects of our invention to provide a process for producing nitrogen solutions in a continuous operation. The advantages of our process are quite obvious. For example, in a continuous operation it is possible to obtain a greater production of nitrogen solution per unit of mixing capacity than in a batch operation. Also, in a continuous operation, after steady state conditions are attained, few, if any, manual adjustments of the operating equipment are required in order to maintain a steady production of uniform product. All these advantages tend to decrease the operational costs of the system.

Also, in the production of nitrogen solutions it is desirable to employ an aqueous solution of ammonium nitrate which, when admixed with ammonia, produces a solution of the desired concentration. It is another object of our invention to provide a novel method for producing aqueous ammonium nitrate solutions of the desired concentrations.

It is a further object of this invention to provide an overall system for producing nitrogen solutions from ammonia, air and water. In such a process ammonia is converted to nitric acid which is then neutralized with ammonia to form ammonium nitrate. The concentration of the latter is adjusted in accordance with our invention, and, since it is desirable to admix the aqueous ammonium nitrate solution and ammonia to produce a nitrogen solution at a relatively low temperature, it is a further object of our invention to affect cooling of the aqueous ammonium nitrate solution while its concentration is being adjusted.

Further and additional objects of our invention will be apparent from our disclosure hereinbelow.

We will describe our invention by referring to the accompanying drawing which is a schematic diagram of one method for effecting our process. This drawing does not include conventional equipment other than that necessary to understand our invention, as pumps, compressors, valves, pressure controllers, flow control equipment, and the like, but the inclusion of such equipment is believed to be within the skill of the art.

Referring to the accompanying drawing liquid ammonia is withdrawn from storage 1 and passed via line 2. After vaporization the gaseous ammonia is admixed with an oxygen-containing gas, such as air, entering the system via line 3 to produce an air-ammonia mixture containing from 8.0 to 10.5 volume per cent ammonia. The resulting mixture is passed via line 4 to ammonia oxidation zone 5 where the mixture is contacted with a platinum-rhodium catalyst at a temperature not above 1700° F., preferably within the range of 1650 to 1670° F., and at a moderately superatmospheric pressure, preferably not above 125 pounds per square inch. In zone 5 ammonia is oxidized to nitric oxide at a minimum conversion efficiency of about 95 per cent. The resulting gaseous effluent is withdrawn from zone 5 and passed via line 6 to absorption zone 7. While passing via line 6 the gaseous effluent is cooled by means not shown, to a temperature not above 300° F., and consequently nitric oxide reacts with oxygen in the gaseous effluent to form nitrogen dioxide. The product of the oxidation of the nitric oxide contains a substantial amount of nitrogen tetroxide, but for convenience we will refer to this product as nitrogen dioxide. Water is introduced to zone 7 via line 8, and any air required for the oxidation of nitric oxide in zone 7 is introduced thereto via line 9. In zone 7 nitrogen dioxide reacts with water to form nitric acid and nitric oxide, and the latter is oxidized to form additional quantities of nitrogen dioxide by air entering the system via line 9. Gaseous effluent, containing no more than 5, and preferably from 2 to 3 volume per cent oxygen is removed from zone 7 via line 10, and nitric acid of at least 50, and preferably from 60 to 65, per cent concentration is withdrawn from zone 7 via line 11 and thence passed to neutralization zone 12. A second portion of ammonia is withdrawn from storage 1 and passed via lines 13 and 14 to zone 12 where it reacts with nitric acid to form ammonium nitrate. The neutralization reaction is effected at an elevated pressure of 25 to 100, preferably about 50, pounds per square inch gauge and at an elevated temperature of 300 to 400° F., preferably about 350° F.

Ammonium nitrate in an aqueous solution is withdrawn from zone 12 via line 15, and it is employed to prepare a nitrogen solution. The ammonium nitrate thus withdrawn is at the temperature and pressure at which the neutralization reaction was effected, preferably at about 350° F. and about 50 pounds per square inch gauge. The concentration of the ammonium nitrate solution is variable and usually from 60 to 85, preferably about 78, weight per cent. In actual operation this ammonium nitrate solution can be employed to prepare any nitrogen solution that is desired or that is marketed commercially. We prefer to prepare nitrogen solutions having the following compositions:

| Composition, Weight percent | 1 | 2 | 3 |
| --- | --- | --- | --- |
| Ammonium Nitrate | 65 | 55.5 | 66.8 |
| Ammonia | 21.7 | 26.0 | 16.6 |
| Water | 13.3 | 18.5 | 16.6 |
| Total | 100 | 100 | 100 |

Our invention is not limited to the preparation of any one or all of these solutions, and the above compositions are used by way of example to facilitate the explanation and understanding of our invention.

To prepare solution 1 we employ an ammonium nitrate aqueous solution of 83 weight per cent concentration. For solution 2 we employ a concentration of 75 weight per cent, and for solution 3 the concentration is 80 weight per cent. However, to obtain ammonium nitrate solutions of such concentrations it is ordinarily necessary for us to adjust the concentration of the ammonium nitrate solution passing via line 15. Also, best results are obtained when the nitrogen solutions are prepared at temperatures considerably lower than the temperature of the solution passing via line 15. Therefore, it is usually deemed desirable to cool this solution. Adjustment of the concentration and of the temperature is effected by passing the solution in line 15 to flash tank 16.

Flash tank 16 adjusts the ammonium nitrate solution concentration and temperature by the controlled evaporation of water, and its operation is based upon the fact that at a given pressure the boiling point of an aqueous ammonium nitrate solution is dependent upon the concentration thereof. For example, at a subatmospheric pressure of 6 inches of mercury absolute a 75 weight per cent aqueous ammonium nitrate solution has a boiling point of 172° F.; an 80 weight per cent solution boils at 180° F.; and an 83 weight per cent solution at 185° F. We prefer to operate flash tank 16 at about a pressure of 6 inches of mercury absolute, but other pressures may be employed. In that event the boiling points of the various ammonium nitrate solutions vary accordingly. For example, when the pressure of a 75 weight per cent aqueous ammonium nitrate solution varies from 5 to 10 inches of mercury absolute, the boiling point of the solution varies from 160 to 190° F.; when the pressure of an 80 weight per cent solution is so varied, the boiling point thereof varies from 170 to 200° F.; and similarly when the pressure of an 83 weight per cent solution is so varied, the boiling point thereof varies from 170 to 210° F.

Flash tank 16 is operated at a constant subatmospheric pressure, and, in order to maintain the aqueous ammonium nitrate solution at a constant concentration, a controlled amount of water is introduced to tank 16 via line 17 at about atmospheric temperature or within the range of 50 to 100° F. in response to the temperature of the solution in tank 16. It is desired to continuously remove a solution of uniform concentration from tank 16, and to do so the solution in tank 16 is maintained at its boiling point at a constant operating pressure. To maintain the solution at a constant predetermined boiling temperature, recording temperature controller 18 is connected to a temperature responsive device, such as a thermocouple or other similar device in the solution in tank 16. Controller 18 is also connected with an activated valve 19 in line 17. The temperature of the solution in tank 16 is transmitted to controller 18 by the temperature responsive device, and, whenever a change occurs in the temperature of the solution in tank 16, controller 18 activates valve 19 either electrically, mechanically or pneumatically to increase or decrease, as the case may be, the amount of water entering tank 16 via line 17. By such adjustment the solution in tank 16 is maintained at its boiling point. Our invention is not limited to the automatic control of the amount of water entering tank 16, as described above, and in some instances it is desirable to use manual control. Usually from 5 to 20 volumes of water are introduced to tank 16 via line 17 for each 100 volumes of solution entering via line 15. However, operating conditions may be so selected that volumetric ratios outside this expressed range are employed. From this discussion it is apparent that we flash aqueous solution of ammonium nitrate at its boiling point and under superatmospheric pressure into an evaporator or flash tank and therein we adjust the concentration of the solution by vaporization of water under subatmospheric pressure so as to produce a solution having a predetermined boiling point under the pressure maintained in the evaporator or flash tank. Also, it is apparent that cooling of the ammonium nitrate solution is effected during the flashing step. Thus, the flashing step provides a continuous stream of an aqueous ammonium nitrate solution of suitable concentration and temperature for the continuous preparation of a nitrogen solution.

Variation in the concentration of the aqueous ammonium nitrate solution passing via 15 has no effect upon the operation of tank 16 provided the concentration does not fall below a minimum value which is determined by the operating pressure of tank 16 and the desired concentration of the solution to be produced therein. In general we prefer to use concentrations of at least 65 weight per cent. To produce a 75 weight per cent ammonium nitrate solution, the minimum concentration of the feed stream varies from 68 to 70 weight per cent as the operating pressure varies from 5 to 15 inches of mercury absolute. To produce an 80 weight per cent solution the minimum feed concentration varies from 73 to 75 weight per cent for a similar pressure variation, and for an 83 weight per cent solution the minimum feed concentration varies from 76 to 78 weight per cent.

Aqueous ammonium nitrate solution of the desired concentration for the preparation of a nitrogen solution is continuously withdrawn from tank 16 via line 20 and continuously introduced to ammoniator 21. A third portion of ammonia is withdrawn from storage 1 and passed via line 13, and the two streams of ammonia and ammonium nitrate are passed via line 22 and cooler 23 to ammoniator 21. The rate of flow of ammonia to ammoniator 21 is adjusted either automatically, or manually, and it depends upon the rate of flow of the ammonium nitrate solution and the product desired. To prepare the three nitrogen solutions discussed above volumetric ratios of liquid ammonia to ammonium nitrate solution within the range of 1:1 to 1:3 are employed, but higher and lower ratios may be employed to prepare nitrogen solution. We add the ammonia to ammoniator 21 in the liquid form, but it may be introduced thereto in the gaseous form. Ammonia in the liquid form is preferred since it offers certain advantages over gaseous ammonia in our process. For example, no ammonia vaporizer and its accessories are required, and no heat is required to vaporize the ammonia. Also, a savings is experienced in the operation of the ammoniator and its accessories since it is not necessary to remove heat of vaporization of the ammonia.

Ammoniator 21 is operated at a temperature lower than that in flash tank 16. Usually the temperature will vary from 75 to 175° F. with a preferred temperature range of 100 to 120° F., and more preferably 105° F. Slightly superatmospheric pressures are employed although atmospheric pressure is satisfactory. The pressure varies from atmospheric to 50 pounds per square inch gauge with the preferred pressure being 10 to 25, and more preferably 15, pounds per square inch gauge.

Pump 22A is incorporated in line 22 for pumping the aqueous ammonium nitrate solution and to increase the pressure on that solution for use in ammoniator 21. Liquid ammonia may be introduced to line 22 on the discharge side of pump 22A in order that advantage can be taken of the increased pressure to reduce the amount of flashing of liquid ammonia when it is introduced to line 22, but in some instances it is desirable to introduce the ammonia to line 22 on the inlet side of pump 22A to obtain improved mixing of the ammonia and the ammonium nitrate.

A nitrogen solution is continuously removed from ammoniator 21 via line 24 and a portion thereof is thus separated from the system as desired product. In order to obtain a continuous production of a nitrogen solution of substantially constant composition, a portion of the solution passing via line 24 is withdrawn via line 25 and recirculated to ammoniator 21 via line 22, pump 22A and cooler 23 with the ammonia and ammonium nitrate feed to the ammoniator. The amount of nitrogen solution that is recycled is variable, but to make our process continuous recycle ratios of nitrogen solution to fresh feed within the range of 2:1 to 10:1 are employed. Cooler 23 in line 22 is used to cool the fresh feed and recirculating solution to ammoniator 21, and it is desirable to hold the temperature of the stream in line 22 to a temperature within the range of 60 to 160° F.

The nitrogen solutions thus-prepared are corrosive, and to reduce the corrosion a corrosion inhibitor is introduced to the system from storage 26. Any suitable inhibitor may be used, and in some instances metallic chromates and dichromates are suitable inhibiting agents. Inhibitor is withdrawn from storage 26 via line 27, and a portion thereof is introduced to the ammonium nitrate solution in line 20. A second portion is employed to adjust the inhibitor concentration in the product of the process, and it is passed from line 27 via line 28 to the product being withdrawn from the system via line 24.

From the above disclosure it is apparent that our invention involves a novel process for continuously producing an aqueous ammonium nitrate solution and for continuously employing solution thus-prepared to continuously produce nitrogen solutions. Modifications of our process within the scope of our invention will be apparent to those skilled in the art.

We claim:

1. A method for adjusting the concentration of an aqueous ammonium nitrate solution which comprises passing a dilute solution of aqueous ammonium nitrate of at least a 65 weight per cent concentration which is at superatmospheric pressure into a vacuum evaporator at a temperature above the boiling point of a more concentrated solution maintained in the evaporator, said evaporator being maintained at a constant subatmospheric pressure of six inches of mercury absolute, introducing cooling water to said vacuum evaporator in a volumetric ratio of 5 to 20 volumes of water per 100 volumes of ammonium nitrate solution as required to compensate for a temperature rise, and maintaining the solution in said vacuum evaporator at a predetermined boiling point at the constant subatmospheric pressure by controlling the amount of water introduced thereby effecting controlled evaporation of water whereby an ammonium nitrate solution of the desired concentration is continuously produced.

2. The method for adjusting the concentration of an aqueous ammonium nitrate solution which comprises maintaining a vacuum evaporator, containing a solution of aqueous ammonium nitrate, at a constant subatmospheric pressure and at a predetermined boiling point, passing a more dilute solution of aqueous ammonium nitrate into said vacuum evaporator at a temperature above that maintained in the vacuum evaporator, introducing cooling water to said evaporator as required to compensate for a temperature rise, and to maintain the boiling point constant at said constant subatmospheric pressure thereby effecting controlled evaporation of water in the evaporator whereby an ammonium nitrate solution of the desired concentration is continuously produced.

3. The method of adjusting the concentration of an aqueous ammonium nitrate solution which comprises passing a dilute solution of aqueous ammonium nitrate into a vacuum evaporator at a temperature above the boiling point of a more concentrated solution maintained in the evaporator, said evaporator being maintained at a constant subatmospheric pressure of six inches of mercury absolute, introducing cooling water to said evaporator as required to compensate for a temperature rise, and maintaining the solution in said vacuum evaporator at a predetermined boiling point at the constant subatmospheric pressure by automatically controlled amount of water introduced thereby effecting controlled evaporation of water whereby an ammonium nitrate solution of the desired concentration is continuously produced.

4. A method according to claim 3 wherein the predetermined boiling point is 172° F. and the concentration of the aqueous ammonium nitrate solution withdrawn from the process is 75 weight per cent.

5. A method according to claim 3 wherein the predetermined boiling point is 180° F. and the concentration of the aqueous ammonium nitrate solution withdrawn from the process is 80 weight per cent.

6. A method according to claim 3 wherein the predetermined boiling point is 185° F. and the concentration of the aqueous ammonium nitrate solution withdrawn from the process is 83 weight per cent.

TOM E. MARTIN.
EDWARD EDMUNDS, Jr.

References Cited in the file of this patent

UNITED STATES PATENTS

| Number | Name | Date |
| --- | --- | --- |
| 1,126,471 | Holmes | Jan. 26, 1915 |
| 1,988,701 | Pyzel | Jan. 22, 1935 |
| 2,023,199 | Harvey | Dec. 3, 1935 |
| 2,109,347 | Beekhuis | Feb. 22, 1938 |
| 2,167,464 | Rogers et al. | July 25, 1939 |
| 2,169,826 | Wendlandt | Aug. 15, 1939 |